United States Patent
Böhler et al.

(10) Patent No.: US 11,890,959 B2
(45) Date of Patent: Feb. 6, 2024

(54) VEHICLE MODULE PROVISION OF SOFTWARE TO BASE MODULE IN AN INDUCTIVE VEHICLE CHARGING SYSTEM, AND METHOD FOR OPERATING THE VEHICLE MODULE

(71) Applicant: BRUSA Elektronik AG, Sennwald (CH)

(72) Inventors: Lukas Böhler, Wangs (CH); Renato Gartmann, Rüthi (CH)

(73) Assignee: BRUSA Elektronik AG, Sennwald (CH)

( * ) Notice: Subject to any disclaimer, the term of this patent is extended or adjusted under 35 U.S.C. 154(b) by 97 days.

(21) Appl. No.: 17/253,328

(22) PCT Filed: Jun. 24, 2019

(86) PCT No.: PCT/EP2019/066661
§ 371 (c)(1),
(2) Date: Dec. 17, 2020

(87) PCT Pub. No.: WO2020/002228
PCT Pub. Date: Jan. 2, 2020

(65) Prior Publication Data
US 2021/0268918 A1    Sep. 2, 2021

(30) Foreign Application Priority Data
Jun. 29, 2018    (DE) .................... 10 2018 115 868.8

(51) Int. Cl.
*B60L 53/66*    (2019.01)
*B60L 53/12*    (2019.01)
*H02J 50/10*    (2016.01)

(52) U.S. Cl.
CPC ............... *B60L 53/66* (2019.02); *B60L 53/12* (2019.02); *H02J 50/10* (2016.02); *B60L 2270/40* (2013.01)

(58) Field of Classification Search
CPC ...... B60L 53/66; B60L 53/12; B60L 2270/40; H02J 50/10
(Continued)

(56) References Cited

U.S. PATENT DOCUMENTS 9,646,435 B2    5/2017 Outwater et al.
2005/0256614 A1*    11/2005 Habermas ............. B60L 3/0023
                                                               701/1
(Continued)

FOREIGN PATENT DOCUMENTS

DE    102009036943 A1    3/2011
DE    102015204362 A1    9/2016
(Continued)

OTHER PUBLICATIONS

English translation of the International Preliminary Report on Patentability issued in International Application No. PCT/EP2019/066661 dated Jan. 7, 2021.

*Primary Examiner* — Richard Isla
*Assistant Examiner* — Manuel Hernandez
(74) *Attorney, Agent, or Firm* — Hoffmann & Baron, LLP

(57) ABSTRACT

A vehicle module CPM of an inductive vehicle charging system for charging an on-board energy store, wherein the vehicle charging system includes the CPM and at least one base module GPM arranged in a stationary manner, the CPM having: a monitoring device, a secondary coil, a managing device, and a communication device, the monitoring device and the communication device are each connected to the managing device, the secondary coil is designed to receive energy inductively transmitted by the GPM; the monitoring
(Continued)

device is designed to ascertain a state Z(t) of the vehicle in which the CPM is installed and/or of the CPM and to transmit information Jo to the managing device in an event of a specifiable state $Z_{Start}$, the managing device is designed to transmit software $SW_{CPM}$ stored on the managing device and intended for the GPM to the GPM by the communication device after obtaining the information $I_O$.

9 Claims, 1 Drawing Sheet

(58) Field of Classification Search
USPC .......................................................... 320/108
See application file for complete search history.

(56) References Cited

U.S. PATENT DOCUMENTS

| | | | |
|---|---|---|---|
| 2011/0099144 A1* | 4/2011 | Levy | B60L 53/30 709/227 |
| 2012/0191242 A1* | 7/2012 | Outwater | G06Q 20/3278 700/236 |
| 2012/0242288 A1 | 9/2012 | Birke et al. | |
| 2018/0029489 A1* | 2/2018 | Nordbruch | G06F 8/65 |
| 2018/0352734 A1* | 12/2018 | Matt | A01D 34/008 |
| 2019/0176637 A1* | 6/2019 | Booth | H02J 7/0014 |

FOREIGN PATENT DOCUMENTS

| | | | | |
|---|---|---|---|---|
| DE | 102017008670 A1 | 6/2018 | | |
| EP | 3103674 A1 * | 12/2016 | ............. | B60L 53/36 |
| EP | 3103674 A1 | 12/2016 | | |
| WO | WO 2017/171561 A1 | 10/2017 | | |

\* cited by examiner

VEHICLE MODULE PROVISION OF SOFTWARE TO BASE MODULE IN AN INDUCTIVE VEHICLE CHARGING SYSTEM, AND METHOD FOR OPERATING THE VEHICLE MODULE

CROSS-REFERENCE TO RELATED APPLICATIONS

The present application is the U.S. National Phase of PCT/EP2019/066661, filed on Jun. 24, 2019, which claims priority to German Patent Application No. 10 2018 115 868.8, filed on Jun. 29, 2018, the entire contents of which are incorporated herein by reference.

FIELD

The invention relates to a vehicle module CPM of an inductive vehicle charging system for charging an on-board energy store, wherein the vehicle charging system includes the vehicle module CPM and at least one base module GPM which is arranged in a stationary manner. Furthermore, the invention relates to a base module GPM for inductive coupling with such a vehicle module CPM, a charging system for a vehicle for charging an on-board energy store including such a vehicle module CPM. The invention further relates to a land vehicle, an aircraft, a watercraft, a rail vehicle or a spacecraft having such a vehicle module CPM. Finally, the invention relates to a method for operating such a vehicle module CPM.

SUMMARY

The object of the invention is to provide a vehicle module CPM of an inductive vehicle charging system for charging an on-board store, which enables the components of the vehicle charging system to be provided with current operating software in an improved manner.

The invention follows from the features of the independent claims. Advantageous refinements and embodiments are the subject of the dependent claims. Other features, applications and advantages of the invention will be apparent from the following description, and from the elucidation of exemplary embodiments of the invention, which are depicted in the figures.

A first aspect of the invention relates to a vehicle module CPM of an inductive vehicle charging system for charging an on-board energy store, wherein the vehicle charging system includes the vehicle module CPM and at least one base module GPM which is arranged in a stationary manner, the vehicle module CPM having: a state monitoring device, a secondary coil, a software managing device, a CPM communication device, wherein the state monitoring device and the CPM communication device are each connected to the software managing device, wherein the secondary coil is designed to receive energy inductively transmitted from the base module GPM, wherein the state monitoring device is designed to ascertain a state Z(t) of the vehicle in which the vehicle module CPM is installed and/or of the vehicle module CPM and transmit information Jo to the software managing device in the event of a specifiable state $Z_{Start}$ and wherein the software managing device is designed to transmit software $SW_{CPM}$ which is stored on the software managing device and intended for the base module GPM to the base module GPM by means of the CPM communication device after obtaining the information Jo.

Advantageously, the software managing device includes a storage unit for storing the software $SW_{CPM}$.

Advantageously, the base module GPM verifies completeness of the transmitted software $SW_{CPM}$ and sends a corresponding verification signal to the vehicle module CPM, which then advantageously terminates the transmission and optionally records successful transmission by the software managing device. Advantageously, the corresponding protocol is also stored on the storage unit.

Advantageously, the state monitoring unit is connected to the vehicle system(s), in particular, to corresponding state sensors of the vehicle. Advantageously, the state monitoring unit includes a processor running a corresponding software program to ascertain the respective states Z(t). The term "state Z(t)" is to be understood broadly herein. It includes electrical states, for example, switching states, dynamic states, climatic states, orientations, positions, energetic states etc. of the vehicle or the vehicle module CPM.

The secondary coil of the vehicle module CPM is advantageously configured as a flat coil.

The software managing device advantageously includes a processor running corresponding management software. The software managing device includes a storage unit storing at least one software program $SW_{CPM}$. The index "CPM" indicates that the software is stored on the vehicle module CPM. In particular, the software $SW_{CPM}$ is operating software for operating the base module GPM. In addition to the software $SW_{CPM}$, a version identifier of the software $SW_{CPM}$ is advantageously stored in the software managing device or the associated storage unit. The version identifier indicates the status or seniority of the software $SW_{CPM}$. The version identifier is typically indicated as a consecutive version number, for example, 1.0, 1.1, 1.2, ... 2.1 ... etc. or as publication date. The most recent version of the software typically has the highest version number or the most recent release date. Other version identifiers are, of course, also included in the inventive concept.

Advantageously, the CPM communication device includes a transmitting unit and a receiving unit for transmitting signals/data to a GPM communication device which is located in the base module GPM. In addition, the CPM communication device is advantageously configured and designed for bidirectional communication with a central data server. In particular, the central data server is used to transmit the most recent version of the operating software SW for operating one or more base units GPM to the vehicle module CPM.

Optimally, the vehicle unit CPM has one or more current software programs $SW_{CPM,i}$ at all times, wherein i is a running index, for operating base modules $GPM_i$.

Thus, the operating software of the base module(s) GPM is updated by vehicle units CPM. This is particularly advantageous because the base modules GPM are typically installed at locations (garages, underground garages, remote parking lots, etc.) where no network connection is available or no mobile Internet can be received. Theoretically, the operating software of the base module GPM can be updated as part of each charging process of the vehicle's energy store.

An advantageous refinement of the proposed vehicle module is characterized by the specifiable state $Z_{Start}$ being a state or a combination of states selected from the following group:

Setting the parking brake of the vehicle;
Switching off the ignition of the vehicle;
Starting inductive energy transfer from GPM to CPM;
Falling below a specified minimum speed;

Reaching a specifiable relative position $RP_{target}$ of CPM and GPM;

Reaching a specifiable relative position $RP_{target}$ of CPM and GPM, in which the base module GPM can be reached by the CPM positioning device to exchange a positioning signal;

Reaching a specifiable relative position $RP_{target}$ of CPM and GPM, in which an inductive charging process can be carried out between the vehicle module CPM and the base module GPM by means of the secondary coil;

Reaching or falling below a specifiable distance between CPM and GPM;

A communication channel between CPM and GPM has been established; and

Actuating a specified input interface in the vehicle.

Of course, other state definitions are included in the inventive concept as well.

Advantageously, the vehicle module CPM includes a CPM positioning device, wherein the CPM positioning device is connected to the CPM communication device and the CPM communication device is additionally configured and designed to exchange a positioning signal between the CPM and GPM. Advantageously, the CPM communication device uses a WLAN, NFC or Bluetooth protocol for communication between the CPM and GPM.

An advantageous refinement of the proposed vehicle module CPM is characterized by the CPM communication device being designed to query a version identifier Vers ($SW_{GPM}$) of a software $SW_{GPM}$ existing on the base module GPM, and the software managing device being designed to transmit the software $SW_{CPM}$ to the base module GPM only if the version identifier Vers($SW_{GPM}$) identifies a version older than a version identifier Vers ($SW_{CPM}$) of the software $SW_{CPM}$, wherein software $SW_{CPM}$ that is transmitted to the base module GPM replaces the software $SW_{GPM}$ previously existing on the base module GPM.

As described above, an older version is typically characterized by a lower version number or an older release date.

An advantageous refinement of the proposed vehicle module CPM is characterized by the software managing device having an assignment table stored thereon which specifies an assignment of the software $SW_{CPM*}$ to at least one identifier $ID_{GPM*}$ of a base module GPM($ID_{GPM*}$), the CPM communication device being designed to query an identifier $ID_{GPM}$ of the base module GPM, and the software managing device being designed to only transmit the software $SW_{CPM}$ to the base module GPM if the queried identifier $ID_{GPM}$ is identical to an identifier $ID_{GPM*}$ in the assignment table. Wherein "*" indicates the data contained in the assignment table for the software $SW_{CPM*}$ and for the identifier $ID_{GPM*}$ of a base module GPM($ID_{GPM*}$).

Advantageously, the CPM communication device is designed for wireless (e.g., mobile Internet etc.) and/or wired (e.g., via a USB stick or connection to a computer network etc.) communication with a central server, wherein the server is designed to transmit current software SW* with a version identifier Vers(SW*) assigned thereto to the software managing device, wherein it updates/replaces the software $SW_{CPM}$ with the version identifier Vers($SW_{CPM}$). This ensures, in particular, that current operating software for one or more base modules GPM is available in the vehicle module CPM as software $SW_{CPM}$ at all times. The server is operated, for example, by a manufacturer of the vehicle modules CPM/base modules GPM.

Advantageously, the current operating software for the vehicle module CPM is also downloaded from the server via the CPM communication device.

Advantageously, the CPM communication device is designed to use a different physical connection technology for the connection to the server than for the connection between CPM and GPM, in particular, mobile Internet.

An advantageous refinement of the proposed vehicle module CPM is characterized by the software managing device being designed to prevent the driving operation of a vehicle in which the vehicle module CPM is installed during communication between the CPM communication device and a base module GPM, in particular, during a transmission of the software $SW_{CPM}$ to the base module GPM. It can thus be ensured that, once started, a transmission of the software $SW_{CPM}$ to the base module GPM is not interrupted by the vehicle driving away from the base module GPM.

Another aspect of the invention relates to a base module GPM for inductive coupling with a vehicle module CPM, as described above, having: a GPM communication device, a primary coil, a software storage, wherein the GPM communication device is designed to communicate with the CPM communication device, the primary coil is designed to inductively couple with the secondary coil of the vehicle module CPM, the software storage is connected to the GPM communication device to store software $SW_{GPM}$ transmitted from the vehicle module CPM, wherein software $SW_{GPM}$ transmitted from the vehicle module CPM replaces the software previously existing on the software storage of the GPM.

In particular, the base module GPM is designed to use the respective software $SW_{GPM}$ stored in the software storage as operating software.

Furthermore, the invention relates to a charging system for a vehicle for charging an on-board energy store, including a vehicle module CPM, as described above, and a base module GPM, as described above, wherein energy is transmitted inductively from the base module GPM to the vehicle module CPM.

The invention further relates to a land vehicle, an aircraft, a watercraft, a rail vehicle with a vehicle module CPM, as described above.

The invention finally relates to a method for operating a vehicle module CPM, as described above, with the following steps: ascertaining a state Z(t) of the vehicle in which the vehicle module CPM is installed and/or of the vehicle module CPM, in the event of a specifiable state $Z_{Start}$, i.e. $Z(t)=Z_{Start}$, transmitting information Jo to the software managing device, and transmitting software $SW_{CPM}$ which is stored on the software managing device and intended for the base module GPM to the base module GPM by means of the CPM communication device after obtaining information Jo.

A more stringent refinement of the proposed method is characterized by the specifiable state $Z_{Start}$ being a state or a combination of states selected from the following group:

Setting the parking brake of the vehicle;

Switching off the ignition of the vehicle;

Starting inductive energy transfer from GPM to CPM;

Falling below a specified minimum speed;

Reaching a specifiable relative position $RP_{target}$ of CPM and GPM;

Reaching a specifiable relative position $RP_{target}$ of CPM and GPM, in which the base module GPM can be reached by the CPM positioning device to exchange a positioning signal;

Reaching a specifiable relative position $RP_{target}$ of CPM and GPM, in which an inductive charging process can be carried out between the vehicle module CPM and the base module GPM by means of the secondary coil;

Reaching or falling below a specifiable distance between CPM and GPM;

A communication channel between CPM and GPM has been established; and

Actuating a specified input interface in the vehicle.

An advantageous refinement of the proposed method is characterized by the vehicle module CPM further including a CPM positioning device, wherein the CPM positioning device is connected to the CPM communication device and the CPM communication device additionally exchanges positioning signals between the CPM and GPM. Advantageously, the CPM communication device uses a WLAN, NFC, or Bluetooth protocol for communication between the CPM and GPM.

An advantageous refinement of the proposed method is characterized by the CPM communication device querying a version identifier Vers($SW_{GPM}$) of a software $SW_{GPM}$ existing on the base module GPM, and the software managing device transmitting the software $SW_{CPM}$ to the base module GPM only if the version identifier Vers($SW_{GPM}$) identifies a version older than a version identifier Vers ($SW_{CPM}$) of the software $SW_{CPM}$, wherein software $SW_{CPM}$ that is transmitted to the base module GPM replaces the software $SW_{GPM}$ previously existing on the base module GPM.

An advantageous refinement of the proposed method is characterized by the software managing device having an assignment table stored thereon which specifies an assignment of the software $SW_{CPM}$ to at least one identifier $ID_{GPM*}$ of a base module GPM($ID_{GPM*}$), the CPM communication device querying an identifier $ID_{GPM}$ of the base module GPM, and the software managing device only transmitting the software $SW_{CPM}$ to the base module GPM if the queried identifier $ID_{GPM}$ is identical to an identifier $ID_{GPM*}$ in the assignment table.

Advantageously, the CPM communication device communicates wirelessly with a central server, wherein the server transmits a current software SW* with a version identifier Vers(SW*) assigned thereto to the software managing device, and wherein the latter updates/replaces the software SWCPM with the version identifier Vers(SWCPM) assigned thereto.

Advantageously, the software managing device prevents the driving operation of a vehicle in which the vehicle module CPM is installed during communication between the CPM communication device and a base module GPM, in particular, during a transmission of the software $SW_{CPM}$ to the base module GPM. Advantageously, the ignition is not enabled or the parking brake is not enabled for this purpose.

Further advantages, features and details will be apparent from the following description, in which at least one exemplary embodiment is described in detail, with reference to the drawings where appropriate. The same, similar and/or functionally identical parts are provided with the same reference numerals.

DETAILED DESCRIPTION

Figure 1:
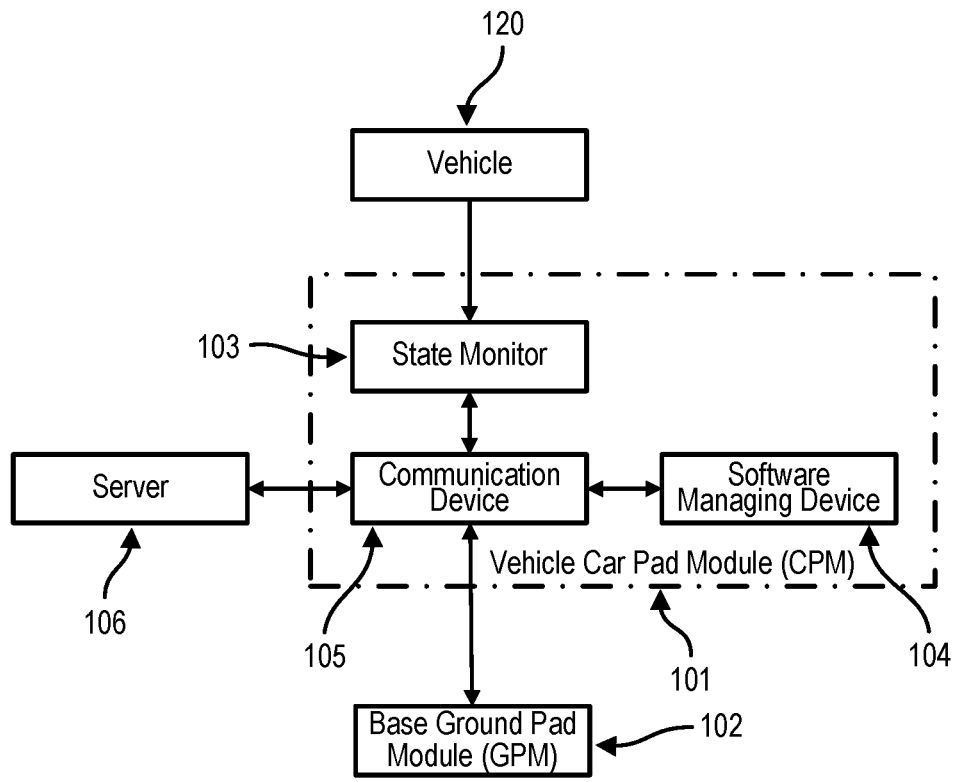
FIG. 1 shows a highly schematic structure of an embodiment of a vehicle module CPM according to the invention.

FIG. 1 shows a highly schematic structure of an embodiment of a vehicle module CPM 101 of an inductive vehicle charging system for charging an on-board energy store, the vehicle charging system including the vehicle module CPM 101 and at least one base module GPM 102 which is arranged in a stationary manner according to the invention. The vehicle module CPM 101 includes a state monitoring device 103, a secondary coil (not shown), a software managing device 104 and a CPM communication device 105. The state monitoring device 103 and the CPM communication device 105 are each connected to the software managing device 104 for data and signal exchange. The secondary coil is used to receive energy that is inductively transmitted from the base module GPM 102. The state monitoring device 103 is designed to ascertain a state Z(t) of the vehicle 120 in which the vehicle module CPM 101 is installed and/or of the vehicle module CPM 101 and transmit information Jo to the software managing device 104 in the event of a specifiable state $Z_{Start}$. The software managing device 104 is designed to transmit software $SW_{CPM}$ which is stored on the software managing device 104 and intended for the base module GPM 102 to the base module GPM 102 by means of the CPM communication device 105 after obtaining the information Jo. In particular, the software $SW_{CPM}$ is operating software for operating the base module GPM.

Furthermore, the CPM communication device 105 is designed to communicate bidirectionally with a central server 106 and to download the most recent version of the operating software for the base module GPM from the central server 106 as software $SW_{CPM}$.

Figure 2:
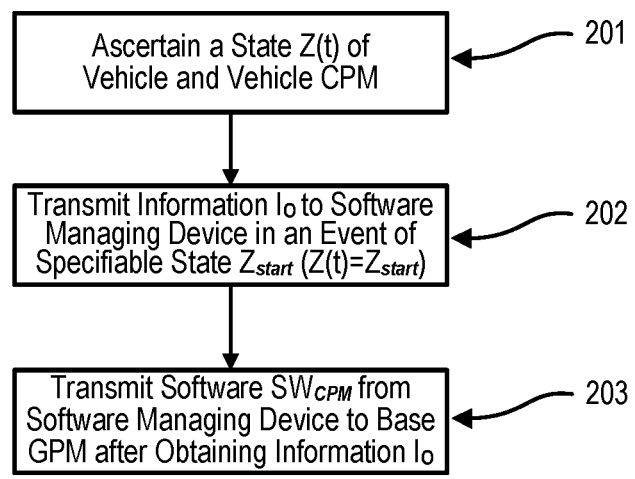
FIG. 2 shows a schematic flowchart of a method according to the invention.

FIG. 2 shows a flowchart of a method according to the invention for operating a vehicle module CPM 101 of FIG. 1. In a first step 201, a state Z(t) of the vehicle 120 in which the vehicle module CPM 101 is installed and/or of the vehicle module CPM 101 is ascertained.

In a second step 202, information Jo is transmitted to the software managing device 104 in the event of a specifiable state $Z_{Start}$, i.e., $Z(t)=Z_{start}$. In a third step 203, software $SW_{CPM}$ which is stored on the software managing device 104 and intended for the base module GPM 102 is transmitted to the base module GPM 102 by means of the CPM communication device 105 after obtaining the information $I_O$.

Although the invention has been further illustrated and described in detail by way of preferred example embodiments, the invention is not limited by the disclosed examples, and other variations can be derived therefrom by those skilled in the art without departing from the scope of the invention. It is therefore clear that a multitude of possible variations exists. It is also clear that exemplified embodiments are really only examples, which are not to be construed in any way as limiting the scope, applicability, or configuration of the invention. Rather, the foregoing description and description of the figures enable one skilled in the art to implement the example embodiments, and those of skill in the knowledge of the disclosed inventive concept may make various changes, for example, as to the function or arrangement of individual elements cited in an example embodiment, without departing from the scope as defined by the claims and their legal equivalents, such as more extensive explanations in the description.

LIST OF REFERENCE NUMERALS

101 Vehicle module CPM
102 Base module GPM
103 State monitoring device
104 Software managing device
105 CPM communication device 106 Central server
120 Vehicle
201-203 Process steps

The invention claimed is:

1. A vehicle car pad module (CPM) of an inductive vehicle charging system for charging an on-board energy store of a vehicle, wherein the vehicle charging system comprises the vehicle CPM and at least one base ground pad module (GPM), the at least one base GPM arranged in a stationary manner, wherein:
the vehicle CPM is installed in the vehicle and integrally includes:
a state monitoring device,
a secondary coil,
a software managing device, and
a CPM communication device;
the state monitoring device and the CPM communication device are each connected to the software managing device;
the secondary coil is configured to receive energy that is inductively transmitted from the at least one base GPM;
the state monitoring device is configured to ascertain a state $Z(t)$ as a combination of a state of the vehicle in which the vehicle CPM is installed and a state of the vehicle CPM, the state monitoring device further configured to transmit information $I_O$ to the software managing device in an event that a specifiable state $Z_{Start}$ is detected, wherein $Z(t)=Z_{Start}$;
the software managing device is configured to transmit software $SW_{CPM}$, the software $SW_{CPM}$ stored on the software managing device and intended for operating the base GPM, to the base GPM via the CPM communication device after obtaining the information $I_O$, wherein the software managing device includes an assignment table stored thereon specifying an assignment of the software $SW_{CPM}$ to at least one identifier $ID_{GPM*}$ of a respective base GPM($ID_{GPM*}$); and
the CPM communication device is configured to query an identifier $ID_{GPM}$ of the base GPM, wherein the software managing device is configured to transmit the software $SW_{CPM}$ to the base GPM only if the identifier $ID_{GPM}$ as queried is identical to an identifier $ID_{GPM*}$ specified in the assignment table.

2. The vehicle CPM according to claim 1, in which the specifiable state $Z_{Start}$ is a state or a combination of states selected from the group consisting of:
setting the parking brake of the vehicle;
switching off the ignition of the vehicle;
starting inductive energy transfer from the base GPM to the vehicle CPM;
falling below a specified minimum speed;
reaching a specifiable relative position $RP_{target}$ of the vehicle CPM and the base GPM;
reaching a specifiable relative position $RP_{target}$ of the vehicle CPM and the base GPM, in which the base GPM is configured to be reached by the CPM positioning device to exchange a positioning signal;
reaching a specifiable relative position $RP_{target}$ of the vehicle CPM and the base GPM, in which an inductive charging process is configured to be carried out between the vehicle CPM and the base GPM via the secondary coil;
reaching or falling below a specifiable distance between the vehicle CPM and the base GPM;
establishing communication between the vehicle CPM and the base GPM; and
actuating a specified input interface in the vehicle.

3. The vehicle CPM according to claim 1, further comprising a CPM positioning device, wherein the CPM positioning device is connected to the CPM communication device, the CPM communication device is configured to exchange a positioning signal between the vehicle CPM and the base GPM.

4. The vehicle CPM according to claim 1, wherein:
the CPM communication device is configured to query a version identifier $Vers(SW_{GPM})$ of software $SW_{GPM}$ existing on the base GPM; and
the software managing device is configured to transmit the software $SW_{CPM}$ to the base GPM only if the version identifier $Vers(SW_{GPM})$ identifies a version older than a version identifier $Vers(SW_{CPM})$ of the software $SW_{CPM}$, wherein software $SW_{CPM}$ that is transmitted to the base GPM replaces the software $SW_{GPM}$ previously existing on the base GPM.

5. The vehicle CPM according to claim 1, wherein the CPM communication device is configured to communicate with a central server, the central server is configured to transmit a current software SW* with a version identifier Vers(SW*) assigned thereto to the software managing device, and the software managing device is configured to update or replace the software $SW_{CPM}$ with the version identifier $Vers(SW_{CPM})$ assigned thereto.

6. The vehicle CPM according to claim 1, wherein the software managing device is configured to prevent a driving operation of the vehicle in which the vehicle CPM is installed during communication between the CPM communication device and the base GPM, the communication related to transmission of the software $SW_{CPM}$ to the base GPM.

7. A charging system for a vehicle for charging an on-board energy store, the system comprising:
a vehicle car pad module (CPM) according to claim 1; and
a base ground pad module (GPM), the base GPM including a GPM communication device, a primary coil, and a GPM software storage, the GPM communication device configured to communicate with the CPM communication device, the primary coil configured to inductively couple with the secondary coil of the vehicle CPM, and the GPM software storage connected with the GPM communication device to store software $SW_{GPM}$ transmitted by the vehicle CPM, wherein the software $SW_{GPM}$ transmitted by the vehicle CPM replaces software previously existing on the GPM software storage;
wherein energy is inductively transmitted from the base GPM to the vehicle CPM.

8. The vehicle CPM according to claim 1, wherein the vehicle is a land vehicle, an aircraft, a watercraft, or a rail vehicle.

9. A method of operating the vehicle CPM according to claim 1, the method comprising:
ascertaining the state $Z(t)$ as the combination of the state of the vehicle in which the vehicle CPM is installed and of the state of the vehicle CPM;
transmitting the information Jo to the software managing device in the event of the specifiable state $Z_{Start}$, wherein $Z(t)=Z_{Start}$;
querying the identifier $ID_{GPM}$ of the base GPM; and
transmitting the software $SW_{CPM}$ stored on the software managing device, and intended for operating the base GPM, to the base module GPM by the CPM communication device after obtaining the information Jo and only if the identifier $ID_{GPM}$ as queried is identical to the identifier $ID_{GPM*}$ specified in the assignment table.

\* \* \* \* \*